L. SAWYER.
PROCESS AND APPARATUS FOR PRODUCING CINEMATOGRAPHIC FILMS.
APPLICATION FILED AUG. 25, 1920.
1,402,541.
Patented Jan. 3, 1922.
2 SHEETS—SHEET 1.
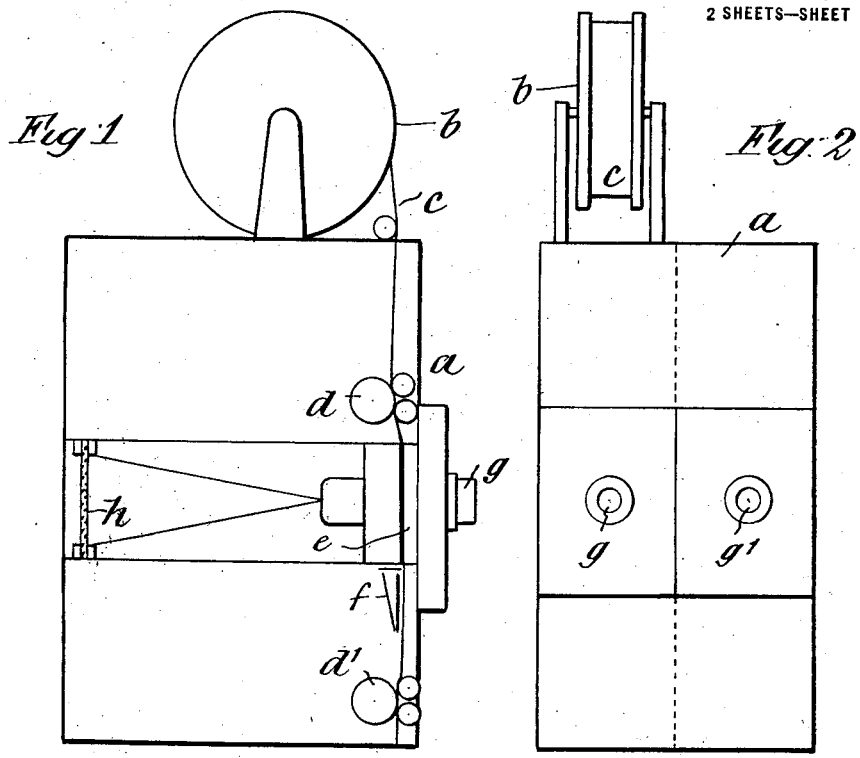
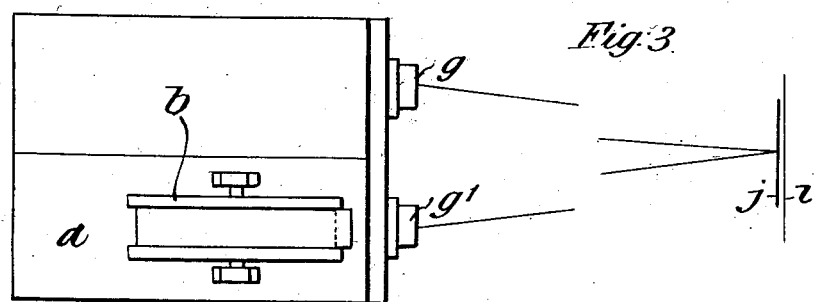
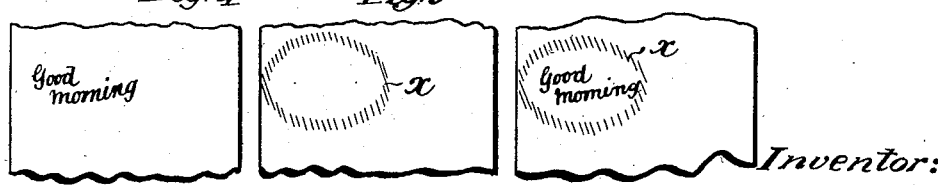
Witnesses:
L. C. Badeau
H. D. Penney
Inventor:
Lyddell Sawyer,
By his Att'y, L. SAWYER.
PROCESS AND APPARATUS FOR PRODUCING CINEMATOGRAPHIC FILMS.
APPLICATION FILED AUG. 25, 1920.

1,402,541.

Patented Jan. 3, 1922.
2 SHEETS—SHEET 2.

Witnesses:
L. C. Badeau
H. D. Penney

Inventor:
Lyddell Sawyer,
By his Att'y, F. H. Richards

UNITED STATES PATENT OFFICE.

LYDDELL SAWYER, OF LONDON, ENGLAND.

PROCESS AND APPARATUS FOR PRODUCING CINEMATOGRAPHIC FILMS.

1,402,541.  Specification of Letters Patent.  Patented Jan. 3, 1922.

Application filed August 25, 1920. Serial No. 405,961.

*To all whom it may concern:*

Be it known that I, LYDDELL SAWYER, a subject of the King of Great Britain, residing in 19 Sloane Street, London, S. W. 1, England, have invented certain new and useful Improvements in Processes and Apparatus for Producing Cinematographic Films, of which the following is a specification.

This invention relates to films for cinematographs and the like and refers to the method of producing films forming part of the invention shown in my U. S. Patent No. 1,356,223, issued October 19, 1920, for films for cinematographs and the like, and according to which words are combined with a scene film in a manner such that they appear either as single words or groups of words adjacent to, and follow the movement of the speaking characters, so that their appearance upon the screen is synchronous with their apparent utterance.

The present invention has for its object certain improvements in the method of producing films such as those above referred to, designed to secure the more accurate positioning of and production of such word matter upon cinematograph scene films.

This invention further provides improved apparatus for the carrying out of the methods according to the present invention.

According to the present invention two cinematograph cameras are employed, one camera being used to photograph the words on the word film the other camera being used to determine the position of the image of the word matter which is viewed through the already taken scene film itself.

My invention also provides means for producing these words in a manner such that they shall be clearly and distinctly visible against various scene film backgrounds, whether these backgrounds be dark or light or of a miscellaneous character.

Whilst it is evident that the cameras may be separate and distinct, one from the other, it is found in practice more convenient to employ a camera of special form, which camera is hereafter refered to as a "duplex camera."

The camera just referred to comprises two cinematograph cameras connected or joined together and having two separate lenses, the sprocket attachment and other cinematograph mechanism being operated by a single handle operating both sprockets.

For my purpose this duplex camera is preferably operated at such a rate as to make one exposure per handle turn and it is arranged so that the mechanism of the two cameras shall work alternately, so that in one camera (the taking camera) the lens is shuttered between exposures and the clutch mechanism is moving the word film into position, while in the other camera (the viewing camera) the lens is open and any film controlled by the clutch mechanism is at that moment in a stationary position.

For the purposes of identification I call one of these separate cameras the "taking camera" and the other the "viewing camera." The viewing camera is employed for the purpose of inspecting, by the light transmitted through the lens, any of the views shown in any already completed scene film requiring word mater, while for the purpose of this inspection the said scene is being passed through this viewing camera. This viewing camera is also utilised for the further purpose of adjusting the position of any word matter upon the scene film which has been set up before the duplex camera and the image of which is thrown upon and visible through this scene film with or without the aid of a contact focusing screen.

I use the taking camera for the purpose of photographing the word matter upon the word film in a corresponding position to that located by the inspection of said word matter as seen in contact with each separate impression of the scene view through the viewing camera.

The duplex camera is preferably mounted upon a camera stand having adjustments whereby the position of the image of the word matter may be adjusted between exposures to such positions as are required to secure its accurate relationship with the speaking figure as they are seen together through the scene view film in the viewing camera.

These said adjustments may be provided for by rack and pinion or ball and socket movements preferably attached to the camera stand head and such movements can be regulated to tilt the camera vertically, laterally or at any other desired angle.

The camera stand may be further provided with an arrangement for raising and lowering the whole of the duplex camera and the stand may also be mounted on wheels or castors running either in grooves or otherwise.

A screw or other turning movement is provided, when found necessary, for the mounts or other attachments of the two lenses, whereby the lenses are caused to converge the word image separately focussed by them until this said word image, both as seen through the viewing camera and as to be taken in the taking camera, exactly coincide in position on their respective films. Or, by an alternative method of regulating the position of the words, the duplex camera and the word support, or carrier, may be fixed to work less or more at a given centre having only means provided to tilt both the camera and word support sideways, so that words can be taken with one of their ends lower than the other. In this case, the perpendicular and lateral positioning of the words is secured by synchronously moving the front mount, on which the taking and the viewing lenses themselves are fixed, either perpendicularly, or laterally, until the desired position is obtained. This method has also the great advantage of always using the central rays of the lenses.

With the object of increasing the size of the word and scene image for observation or other purposes a second lens may be fixed inside the viewing camera behind the usual gate position and an extra focussing screen or eyepiece may be arranged at the back of the said camera. On this second focussing screen or eyepiece an enlarged image is obtained of both word and scene which has the advantage of being displayed both right way about and right way up. Prior to commencing to photograph the word matter it is advisable that it should be written or plotted out at length in a specially ruled book of suitable form which is preferably called the "script chart" and sufficient space is ruled off therein against each consecutively numbered word or group of words to add such information regarding it as may be subsequently useful while photographing it.

As the object of the viewing camera is to produce an image of the word matter as seen through the film scene, I wish it to be understood that I include any combination of lenses and any position of the scene film whether in front of, between or behind these lenses which will produce this effect.

As a further means of conveniently regulating the photographing of the word matter the finished scene film, to which this word matter is ultimately to be added, is inspected before placing in the camera either through a projecting lantern or, more directly, by light transmitted from a reflecting stand, or by other suitable means, and the particular scene view selected as that on which any word matter is to commence is marked upon the scene film by a number corresponding to the one already recorded in the "script chart."

The background against which the word matter is to be photographed may be of any convenient size and I prefer it being made or orange or red coloured rather than black velvet as giving a maximum of optical reflecting luminosity coupled with a minimum of photographic actinism. A white background may also be provided for temporary use between the dark background and the word matter for the purpose of assisting in the inspection of the combined scene view and word images through the viewing camera, between the exposures.

The word matter which is to be photographed may be conveniently in the form of written, printed, "cut out", enamelled metal or other letters and a convenient way of holding the word matter is to clamp or otherwise fix it in an adjustable support. This support may be connected by a thin black rod either to a movable stand resting on the floor or to an overhead attachment on which it can be moved to various positions or in any other convenient way. The word support should be attached in such a way that it can be tilted in various directions for the purpose of being pohtographed at various angles. The movements of this word support are mostly supplementary to the movements described and arranged for in the duplex camera itself. The word matter can be photographed either by daylight or artificial light, but preferably the latter, and in this case it is convenient to use two powerful lamps of preferably electric light one on either side concentrating their light upon the word matter. Each of these lamps, if electric light, may consist of a series of separate bulbs which may be controlled by separate switches for the purpose of varying the intensity of the light upon the word matter.

Or, as an alternative method of illumination, a single powerful artificial light may be used which is all closed in excepting what light is allowed to pass through a suitable slit to illuminate the word matter alone.

This method has the great advantage that it can be used to concentrate the light upon the word matter alone with less or more softly vignetted surrounding, and the rest of the background can be left in shadow.

Where one fixed light alone is used for photographing the various modifications of luminosity can be obtained either by varying the diaphragms of the taking lens, or by interposing screens of varying thickness between the illuminating light and the word matter.

The background may have special illumination between exposures for inspection of the words but during the exposure it should be as much as possible in the shadow.

There are various methods, applicable both to the present invention and to that forming the subject of the prior application before referred to, in which kinematograph films may be employed for the purpose of photographing word matter upon scene films and for the purpose of illustrations I will now describe three of these in detail.

According to one method, which may be termed the direct method of producing light words against dark backgrounds, the word matter to be photographed is of light lettering and the first word or group of words is placed in the word support against the dark background and its position is located in relation to the scene by inspecting it through the film of the scene view itself as seen in the viewing camera. The required number of impressions, as noted in the "script chart", are then photographed in the taking camera on the word film in positions corresponding to those located through the scene film in the viewing camera. Each further word or group of words is taken in succession upon the same or extra lengths of film by the like procedure.

After being taken the negative word film in printed form in direct contact with the negative scene film and the resulting positive which is used for projection shows both scene and words in combination, this procedure being common to any other of the methods hereafter described.

According to the second method, which may be termed the "compound method", and which is designed for producing word matter against either miscellaneous light and shade or other backgrounds this is arranged for by forming a local surrounding to each of the words or groups of words. The local surroundings referred to and which are designated as "blanks," may be shaded or vignetted or otherwise treated to produce a considerable variety of effects such as for example that of the clouded breath issuing from the mouth of a speaker and showing the word matter within its radius. Or, as another alternative, the blanks may be white with a sharper outline with or without a pointer indicating the direction of the speaker's mouth. According to this method a negative "blanks" film is photographed in the taking camera from a series of suitable blank shapes, and their places are located through the scene film in the viewing camera in corresponding positions to those required for the word matter. The resulting negative showing opaque blanks, is printed from in contact with the original negative scene film and from this combination a positive is obtained showing a series of clear blanks against the miscellaneous scene background. A negative opaque words film is next taken by photographing light word matter against a dark background and the position of the words in relation to the clear blanks is located through the scene-blanks positive in the viewing camera. This resulting negative word film is now printed from in contact with the scene-blanks positive, and from these in combination is obtained a reproduced negative showing clear (dark) words with opaque (light) surroundings against the miscellaneous or other background.

According to the third method designed for producing dark word matter against light backgrounds, a positive film is printed from the original light background negative scene film and in this positive is shown a clear (light) background. A negative opaque words film is then taken in which the word matter is located through the clear background scene positive in the viewing camera. This clear background scene positive and this opaque word negative are next printed from in contact and the resulting reproduced negative shows clear (dark) word matter against its opaque (light) background.

It is obvious that there may be modifications of the herein described methods of using the two cameras and other appliances related thereto for accurately positioning words and modifications may be also made in the herein described methods of arranging films to obtain suitable clearness of words against various backgrounds.

In order that the invention may be the better understood drawings are appended in which:—

Fig. 1 is a sectional view of a cinematograph camera in accordance with this invention.

Fig. 2 is a front view,

Fig. 3 is a plan,

Figs. 4, 5 and 6 are views showing various stages in the production of the film.

Figure 7:
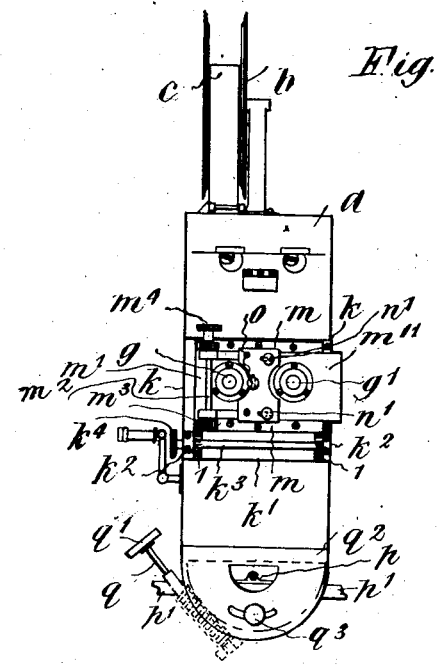
Fig. 7 is a front view showing more clearly the means for securing the adjustment of the camera.

Referring to the accompanying drawings $a$ indicates generally the camera which in substance comprises two cameras one for viewing and the other for taking. $b$ indicates a spool carrying the scene film indicated by $c$. In the drawing the spool is shown as being outside the camera but obviously it may be inside if desired.

The movement of the scene film is controlled by means of the sprockets $d$, $d^1$, $e$ indicating the gate before which the film is drawn by a clutch indicated by $f$ upon which gate, if desired, a focusing screen may be fitted whereby the image of the word can be viewed in contact with the scene film.

$g$, $g^1$ indicate the respective lenses of the taking and viewing cameras, a supplementary lens being provided if desired at $g^2$ whereby the scene and the word as seen at the gate may be inspected upon a second screen provided at $h$. By means of the second screen $h$ an enlarged view of the scene and word may be obtained presenting the advantage that the scene and word which are shown inverted upon the gate screen are reversed and fall upon the screen $h$ the right way up.

It will be understood that whilst the arrangement and operation of the two cameras is substantially identical and that the operation of the mechanism of both is effected by a single handle, the said mechanism is so arranged that whilst the scene view is in position for inspection in the viewing camera the shutter in the taking camera is closed.

In Fig. 3 $i$ indicates a background and $j$ the word which is to be photographed upon the scene film the various stages in the production of the film being shown in Figs. 4, 5 and 6. In Fig. 4 a portion of word film is shown upon which words are photographed. In Fig. 5 a portion of the scene positive is shown having upon it a blank space indicated by $x$ destined to receive the words and formed by interposing another film, on which the blank space has already been photographed, between the scene negative and a sensitive film and printing upon the latter this combined scene-blanks positive. In Fig. 6 a portion of a scene negative film is shown having words printed thereon within the aforesaid blank, $x$, by placing a film as shown in Fig. 4 between the film of Fig. 5 and the sensitive film of Fig. 6 a combination print being taken of the two films upon the third.

Figure 8:
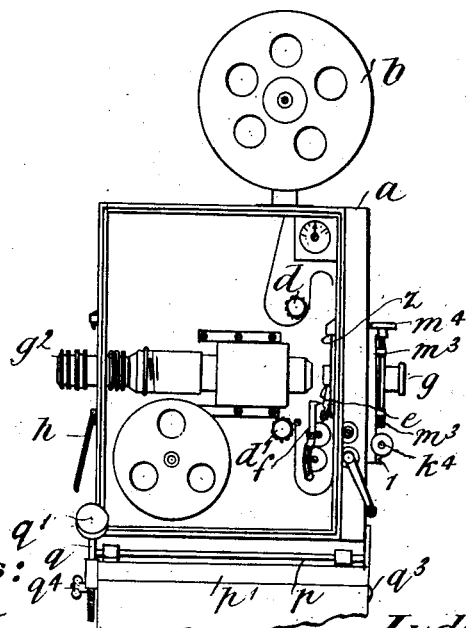
Fig. 8 is a side view.

As previously stated provision is made both for adjusting the position of the lenses upon the camera and for tilting the camera itself. The means for adjustment of the lenses is shown more clearly in Figs. 7 and 8 on reference to which it will be seen that the front of the camera is provided with vertical guides K in which is slidable a plate $K^1$ the movement of said plate being effected by means of pinions $K^2$ carried by a spindle $K^3$ said spindle being provided with a milled head $K^4$ whereby it can be conveniently rotated. The pinions $K^2$ engage racks 1 fixed relatively to plate $K^1$. Secured in any convenient manner to the aforesaid plate $K^1$ are guides $m$ running transversely of said plate and in which are slidably mounted plates $m^1$, $m^{11}$ having brackets thereon carrying a spindle $m^2$ having pinions engaging racks $m^3$ secured to the aforesaid guides $m$, said spindle being operable by means of the milled head $m^4$. Disposed transversely of the plates $m^1$ and secured to plate $m^1$ is a plate $n$ slotted for the passage of screws $n^1$ tapped into the plate $m^{11}$ whereby said plate is capable of adjustment with respect to plate $m^1$ so as to vary the distance between the lenses, the plates $m^1$ $m^{11}$ when the aforesaid screws are tightened being coupled or connected together through plate $n$ so that they move as one on the operation of the spindle $K^3$. Provision is made by means of a screw $o$ whereby the lenses may be independently adjusted in the vertical plane.

In order that the camera may be rocked for tilting in the vertical plane it is provided upon the bottom with eyes carrying a spindle $p$ for which bearings are provided upon a plate $p^1$ upon which the camera is mounted. Secured to the plate $p^1$ is a bearing through which passes a spindle $q$ operable by means of a milled head $q^1$. The spindle is provided with a screw thread engaging a toothed sector upon a plate secured to the aforesaid spindle $p$. Provision is made for clamping the parts after adjustment comprising a bolt $q^3$ passing through a slot in a plate $q^2$ secured to the front of the camera and provided at its rear end with a fly-nut $q^4$. The bolt $q^3$ passes through a slotted plate fixed to the back end of the camera support.

Claims—

1. A camera for use in a method of producing cinematograph films having words applied thereto and closely adjacent to and following the moving characters of the scene, comprising two camera elements one of which is arranged for observation purposes whilst the other is arranged for taking photographs, means for passing a developed film of the scene through the field of view of said observing element, means for inspecting word matter set up before the camera through the scene film, means for passing an unexposed film through the taking element concurrently and means for adjusting the two elements to secure a corresponding positioning of the words as seen in the observing element upon the film in the taking element.

2. A camera for use in a method of producing cinematograph films having words applied thereto and closely adjacent to and following the moving characters of the scene, comprising two camera elements one of which is arranged for observation purposes whilst the other is arranged for taking photographs, means for passing a developed film of the scene through the field of view of said observing element, means for inspecting word matter set up before the camera through the scene film, means for passing an unexposed film through the taking element concurrently with the passage of the scene film through the observation element, means for adjusting the two elements to secure a corresponding positioning of the words as seen in the observing element upon the film in the taking element, and means for effecting the primary adjustment of the lens.

3. A camera for use in a method of producing cinematograph films having words applied thereto and closely adjacent to and following the moving characters of the scene comprising two camera elements one of which is arranged for observation purposes whilst the other is arranged for taking photographs, means for passing a developed film of the scene through the field view of said observing element, means for inspecting word matter set up before the camera through the scene film, means for passing unexposed film through the taking element concurrently with the passage of the scene film through the observation element, means for adjusting the two elements to secure a corresponding positioning of the words as seen in the observing element upon the film in the taking element and screw operated means for securing a synchronous adjustment of the lenses whereby said lenses are caused to converge the word image separately focussed by them until the word image, both as seen through the viewing element and as to be taken in the taking element, are co-incident upon the respective films.

4. A camera for use in a method of producing cinematograph films having words applied thereto and closely adjacent to and following the moving characters of the scene comprising two camera elements one of which is arranged for observation purposes whilst the other is arranged for taking photographs, means for passing a developed film of the scene through the field of view of said observing element, means for inspecting word matter set up before the camera through the scene film, means for passing an unexposed film through the taking element concurrently with the passage of the scene film through the observation element, means for adjusting the two elements to secure a corresponding positioning of the words as seen in the observing element upon the film in the taking element, a member mounted upon the front of the camera and movable transversely thereof, screw operated means for moving said member in one or other direction, a second member movable upon the first member and upon which member the lenses are mounted, screw operated means whereby said member may be moved in one or other direction vertically of the member upon which it is mounted whereby a synchronous adjustment of the lenses is secured and they are caused to converge the word image separately focussed by them until the word image, both as seen through the viewing element and as to be taken in the taking element, are co-incident upon the respective films.

5. In a camera for use in a method of producing cinematograph films having words applied thereto closely adjacent to and following the moving characters of the scene, a viewing element, a lens for said viewing element, a screen upon which the image formed by said lens is received, a taking element, means for feeding the film through the viewing element, means for feeding the film through the taking element, a shutter for the taking element, means for operating said shutter, said shutter operating means being so set that whilst the film in the viewing element is stationary the shutter in the taking element is closed.

6. In a camera for use in a method of producing cinematograph films having words applied thereto closely adjacent to and following the moving characters of the scene, a viewing element, a lens for said viewing element, a screen upon which the image formed by said lens is received, a second lens interposed between the screen of the first lens and a second screen whereon the image formed by the first lens is reversed and shown in an erect position, a taking element, means for feeding the film through the taking element, a shutter for the taking element, means for operating said shutter, said shutter operating means being so set that whilst the film in the viewing element is stationary the shutter in the taking element is closed.

7. In a camera for use in a method of producing cinematograph films having words applied thereto closely adjacent to and following the moving characters of the scene, a viewing element, a lens for said viewing element, an eye-piece upon which the image formed by said lens is received, a taking element, means for feeding the film through the viewing element, means for feeding the film through the taking element, a shutter for the taking element, means for operating said shutter said shutter operating means being so set that whilst the film in the viewing element is stationary the shutter in the taking element is closed.

8. In a camera for use in a method of producing cinematograph films having words applied thereto closely adjacent to and following the moving characters of the scene, a viewing element, a lens for said viewing element, a screen upon which the image formed by said lens is received, a second lens interposed between the screen of the first lens and an eye-piece by which the image formed by the first lens is reversed and shown in an erect position, a taking element, means for feeding the film through the taking element, a shutter for the taking element, means for operating said shutter said shutter operating means being so set that whilst the film in the viewing element is stationary the shutter in the taking element is closed.

9. In a camera for use in a method of producing cinematograph films having words applied thereto closely adjacent to and following the moving characters of the scene, a viewing element, a lens for said viewing element, a screen upon which the image formed by said lens is received, a taking element, means for feeding the film through the viewing element, means for feeding the film through the taking element, a shutter for the taking element, means for operating said shutter said shutter operating means being so set that whilst the film in the viewing element is stationary the shutter in the taking element is closed, and screw operated means for securing a synchronous adjustment of the lenses whereby said lenses are caused to converge the word image separately focussed by them until the word image, both as seen through the viewing element and as to be taken in the taking element. are co-incident upon the respective films.

In testimony whereof I affix my signature in the presence of two witnesses.

LYDDELL SAWYER.

Witnesses:
   J. BURTON,
   J. KNELL.